US010550301B2

(12) United States Patent
Elagin et al.

(10) Patent No.: US 10,550,301 B2
(45) Date of Patent: *Feb. 4, 2020

(54) SUBSTANCE FOR COLLECTING PETROLEUM OR PETROLEUM PRODUCTS FROM SURFACE OF WATER AND UTILIZATION METHOD THEREOF (VARIANTS)

(71) Applicant: Obschestvo S Ogranichennoj Otvetstvennostyu "NPO Biomikrogeli", Ekaterinburg (RU)

(72) Inventors: Andrey Aleksandrovich Elagin, Ekaterinburg (RU); Maksim Anatolevich Mironov, Ekaterinburg (RU); Ilya Dmitrievich Shulepov, Ekaterinburg (RU)

(73) Assignee: Obschestvo S Ogranichennoj Otvetsvennostyu "NPO Biomikrogeli", Ekaterinburg (RU)

( * ) Notice: Subject to any disclaimer, the term of this patent is extended or adjusted under 35 U.S.C. 154(b) by 250 days.

This patent is subject to a terminal disclaimer.

(21) Appl. No.: 15/317,960

(22) PCT Filed: Jun. 9, 2015

(86) PCT No.: PCT/RU2015/000358
§ 371 (c)(1),
(2) Date: Dec. 11, 2016

(87) PCT Pub. No.: WO2015/190951
PCT Pub. Date: Dec. 17, 2015

(65) Prior Publication Data
US 2017/0130110 A1 May 11, 2017

(30) Foreign Application Priority Data
Jun. 11, 2014 (RU) .............................. 2014124090

(51) Int. Cl.
C09K 3/32 (2006.01)
B09C 1/00 (2006.01)
C11D 3/22 (2006.01)
E02B 15/04 (2006.01)
(Continued)

(52) U.S. Cl.
CPC ................ C09K 3/32 (2013.01); B01J 20/24 (2013.01); B01J 20/28004 (2013.01);
(Continued)

(58) Field of Classification Search
CPC ....... C09K 3/32; B01J 20/24; B01J 20/28004; B01J 20/280007; B01J 20/28016;
(Continued)

(56) References Cited

U.S. PATENT DOCUMENTS 5,338,561 A * 8/1994 Campbell .............. A23D 7/011
426/573
7,229,952 B2 6/2007 Reddy et al.

FOREIGN PATENT DOCUMENTS

RU 2033389 4/1995
RU 2087422 8/1997
(Continued)

OTHER PUBLICATIONS

Grem, Chitosan Microspheres Applied for Removal of Oil from Produced Water in the Oil Industry, Feb. 16, 2013, p. 1-3 (Year: 2013).*
International Preliminary Report on Patentability dated Oct. 5, 2016.
Translation of International Preliminary Report on Patentability dated Oct. 5, 2016.
Written Opinion of the International Searching Authority dated Sep. 24, 2015.
(Continued)

Primary Examiner — Bobby Ramdhanie
Assistant Examiner — Donovan Bui-Huynh
(74) Attorney, Agent, or Firm — Preston Smirman; Smirman IP Law, PLLC

(57) ABSTRACT

The group of inventions relates to the field of organic chemistry and can be used for collecting films of petroleum, oils, mazut, fuels, hydrocarbons and other petroleum products with the aim of cleaning the surface of water, and also for cleaning water flows which have been contaminated by petroleum or petroleum products. A substance for collecting petroleum or petroleum products from the surface of water includes a natural polymer and additionally includes a biodegradable surfactant in the form of an aqueous solution with a concentration of no less than 0.1 g/L, and, as the natural polymer, contains polysaccharide microgels having a mass of between 20,000 and 200,000 daltons and a particle size of between 50 and 600 nm in the form of an aqueous solution with a concentration of no less than 0.2 g/L, wherein the ratio of polysaccharide microgels to biodegradable surfactant is between 12:1 and 2:1. Methods for collecting petroleum or petroleum products from the surface of water include processing the surface of a film of petroleum or petroleum products using a reagent, and then collecting the product of the reaction thereof. The reagent consists in polysaccharide microgels having a mass of between 20,000 and 200,000 daltons and a particle size of between 50 and 600 nm. According to a first variant, before or after spraying the reagent, a biodegradable surfactant is used for processing a film of petroleum or petroleum products, or a portion of said film; or, according to a second variant, the reagent is first mixed with the biodegradable surfactant until achieving a ratio of polysaccharide microgels to biodegradable surfactant of between 12:1 and 2:1. The technical result consists in decreasing the specific consumption of reagents used in the process of collecting petroleum or petroleum products from the surface of water, in enhancing the surfactant qualities of reagents, and also in reducing the residual amounts of said reagents in water.

13 Claims, No Drawings

(51) Int. Cl.
*C02F 1/56* (2006.01)
*B01J 20/24* (2006.01)
*B01J 20/28* (2006.01)
*C02F 101/32* (2006.01)

(52) U.S. Cl.
CPC ... *B01J 20/28007* (2013.01); *B01J 20/28016* (2013.01); *B01J 20/28047* (2013.01); *C02F 1/56* (2013.01); *E02B 15/04* (2013.01); *C02F 2101/32* (2013.01)

(58) Field of Classification Search
CPC ....... B01J 20/28047; C02F 1/286; C02F 1/40; C02F 1/56; C02F 2101/32; E02B 15/04
See application file for complete search history.

(56) References Cited

FOREIGN PATENT DOCUMENTS

| | | |
|---|---|---|
| RU | 94030825 | 10/1997 |
| RU | 2002129150 | 8/2004 |
| RU | 2466238 | 11/2012 |
| RU | 2492905 | 9/2013 |
| RU | 2514645 | 4/2014 |

OTHER PUBLICATIONS

International Search Report dated Oct. 22, 2015.
Translation of International Search Report dated Oct. 22, 2015.
English Abstract of RU 2514645.

\* cited by examiner

SUBSTANCE FOR COLLECTING PETROLEUM OR PETROLEUM PRODUCTS FROM SURFACE OF WATER AND UTILIZATION METHOD THEREOF (VARIANTS)

CROSS-REFERENCE TO RELATED APPLICATION

The instant application is a national phase of PCT International Application No. PCT/RU2015/000358, filed Jun. 9, 2015, and claims priority to Russian Patent Application Serial No. 2014124090, filed Jun. 11, 2014, the entire specifications of both of which are expressly incorporated herein by reference.

This group of inventions relates to organic chemistry and can be used for skimming films of petrol, mineral oils, black oil, hydrocarbons and other petroleum products for cleaning the surface of water as well as for cleaning natural water flows polluted with oil or oil products.

There exists a material for collecting oil or oil products from the surface of water in the event of an emergency spill. This material presents a sorbent agent: hydrolysis lignin of 8-15% humidity (Patent RU 2033389, CO2F1/40, E02B15/04, 15.07.1991).

The drawback of this material is its high consumption rate in treatment of thin petroleum films for collecting them from the surface of water.

The prototype selected was a material for sorption of oil or oil products from the surface of water or soil. This material presents a sorbent based on polyvinylchloride and containing the following sorption agents: polystyrene, polypropylene, polyethylene, their copolymers in any molecular proportion, with particle polydispersity within the 5-200 μm range (invention application RU 94030825, IPC E02B15/04, CO2F1/28, 18.08.1994).

The drawback of this prototype material is that it does not decompose in natural conditions and its presenting a hazard to living organisms during collection of petrol or petroleum products from the surface of water.

The drawback common for all the known materials is the difficulty of depositing them onto the surface of large petroleum slicks without significant losses of these materials during their utilisation for collecting oil or oil products from the surface of water. In addition, these materials stay in the column of water during the cleaning process, causing damage to the environment, and have low surface activity properties.

There is a known method for collecting oil or oil products from the surface of water during emergency spills, which includes coating a petroleum slick evenly with a sorbent based on timber processing waste, absorption of oil or oil products, then removing the layer thus produced from the surface of water using with mechanical means. To make the method more efficient and economical, hydrolysis lignin of 8-15% humidity is used as the sorbent agent, at volumetric flow rate of 15-35% in relation to the volume of the spilled oil or oil products [Patent RU 2033389, CO2F1/40, E02B15/04, 15.07.1991].

The drawbacks of this method are difficulties with coating an oil slick with a sorbent and the high consumption rate of the sorbent during the treatment of thin oil films.

There is another known method for skimming oil spills from the surface of water. This method includes spraying the film of oil with a ferromagnetic sorbent, then scooping it up together with oil. The oil-water-sorbent mixture removed from the surface of water is then pumped through a magnetising device, which includes magnetic plates coated with a low-friction film, then through a turbulator, where coagulation of ferromagnetic particles of the absorbent takes place. When this process is completed, agglomerates together with oil are separated from water (Patent RU 2466238, E02B15/04, CO2F1/48, 12.05.2011).

The drawback of this method is its complexity and its reliance on special equipment for scooping oil up from the surface of water.

The method for the sorption of oil or its products from the surface of water or soil selected as the prototype for the present invention includes spraying the polyvinyl-chloride-based sorbent, then collecting the oil, while the sorbent used represents polystyrene, polypropylene, polyethylene or their co-polymers in any molecular ratio, with the particle size range of 5-200 μm [Patent Application RU 94030825, IPC E02B15/04, CO2F1/28, 18.08.1994]. The use of these sorbents improves effectiveness and selectiveness of the sorption.

The drawback of this method is the loss of fine particles, carried away by air flow, resulting in secondary pollution of the environment due to the fact that the above polymers do not decompose in ambient conditions and are a hazard for living nature.

The drawback general for all the existing methods is the use of solid sorbents, the coating with which of a large oil spill is difficult, causing significant losses of the sorbent. Also, the agents used in the oil collecting process stay in the water column and have a negative effect on the environment and their properties as surface-active agents are low.

The present group of inventions aims at improving effectiveness of the skimming of oil or oil products from the surface of water, while also making this process safer for the environment.

The technological result, at which this group of inventions aims, is to decrease specific consumption of the agents used in the process of the collecting of oil or oil products from the surface of water, improve surface-activity of the agents and reduce the quantity of the residue of these agents in the water.

The essence of the proposed material is as follows.

The material for collecting oil or oil products from the surface of water includes a natural polymer. Unlike the prototype, the present invention also includes a bio-degradable surface-active material in the form of an aqueous solution with at least 0.1 g/l concentration. The natural polymer represents polysaccharide gels of 20,000-200,000 Daltons mass and particle size of 50-600 nm in the form of an aqueous solution with concentration of at least 0.2 g/l, while the ratio of polysaccharide gels to the bio-degradable surface-active material must be in the 12:1 to 2:1 range.

The essence of the proposed method, in accordance with Version 1, is as follows

The method of collecting oil or oil products from the surface of water, in first version, includes treating the surface of the film of oil or oil products with a natural polymer containing agent, then collecting their interaction product. Unlike the prototype, the surface of the film of oil or oil products is treated with an agent, which represents polysaccharide gels of 20,000-200,000 Daltons of mass and particle size of 50-600 nm, in the form of an aqueous solution with at least 0.2 g/l concentration. Prior or after the spraying of the agent, the entire film of oil or oil products or its part is treated with a biodegradable surface-active agent in the form of an aqueous solution with at least 0.1 g/l concentration.

In Version 1, a biodegradable, surface active material can be applied either to the entire surface of a film of oil or oil products, or to its centre or along its outline, or to its any part. Applying a bio-degradable, surface active material along the outline of the film is preferable.

Version 2 of the proposed method includes the following steps.

Collecting oil or oil products from the surface of water includes treating the surface of the film of oil or oil products with a natural polymer-containing agent, then skimming their interaction product. Unlike the prototype, the proposed method has the surface of the film of oil or oil products treated with an agent representing polysaccharide gels of 20,000-200,000 Dalton mass and 50-600 nm particle size, in the form of an aqueous solution of at least 0.2 g/l concentration, a-priori mixed with a biodegradable surface-active material in the form of an aqueous solution of at least 0.1 g/l concentration, taking into account that the final ratio of polysaccharide microgels to the biodegradable surface-active material must measure 12:1 to 2:1.

The microgels represent branched colloidal polymer particles of 0.01-1 μm, capable of swelling in solvents due to electrostatic or steric repulsion between charged groups. They are formed either by directional polymerisation of monomers or by pH-initiated neutralisation of solutions of synthetic or natural polymers carrying carboxyl or amino groups. The polysaccharide microgels used in this group of inventions include colloidal solutions of natural polysaccharides: low substituted (<40%) carboxymethyl cellulose or its salts formed with aliphatic amines (butylamine, benzylamine, ethylendiamine, hexamethylendiamine), chitosan deacetylated at 90-97%; pectin materials with less than 25% of residual methoxy groups. Molecular mass of the products can vary within the 20,000-200,000 D.): high-molecular (over 200,000 D.) and low-molecular (less than 20,000 D.) derivatives of polysaccharides are unsuitable for this technology. Polysaccharide gels used in this method can be produced by physical association or chemical stitching. Chemical stitching of polymer chains of polysaccharides is employed to produce more stable over long periods of time polysaccharide gels, with the use of anhydrides and activated ethers of dicarbonic acids, di-isocyonides or other stitching agents. It is preferable to keep diameter of chemically stitched particles of a polysaccharide microgel within 50-600 nm. Experiments show that the lowest concentration of polysaccharide gels in the agent must be no less than 0.2 g/l. The use of higher concentrated solutions, although it guarantees the desired outcome, it results in a greater consumption of microgels of polysaccharides.

Biodegradable materials were used in this group of inventions because they guarantee ecological safety of this technology. Examples of biodegradable, surface-active materials are derivatives of cyclic acetals, alkyl glucosides, complex ethers of cholines and fatty acids, betaine ethers, and phosphate ethers of fatty alcohols. The lowest concentration of the surface-active agent in aqueous solution must be such as to ensure contraction of the film of oil or of oil products, and it must reduce the surface area of a spill of oil or oil products. That ability depends on surface tension at the air-water interface. Experiments show that most surface-active agents gather a film of oil or of oil products when their concentration in an aqueous solution is not lower than 0.1 g/l.

The proposed group of inventions can be used for collecting any kind of oil, immiscible with oil and of higher density than water. Oils of this kind form films on the surface of water, which can be scooped up, using the proposed group of inventions. From the practical point of view, this group of inventions is most promising for collecting oil or oil products from the surface of water.

Using Version 2 and the proposed material in conjunction with carbomethyl cellulose-based microgels, it is preferable to use either anion or cation biodegradable surface-active agents. When the proposed material is used in combination with chitosan, it is preferable to use cation biodegradable surface-active agents, while its use in combination with pectin materials makes nonionic or anionic biodegradable surface-active agents preferable.

The two proposed methods aim at collecting oil or oil products from the surface of water to produce more or less identical technological results, and both use the same principle.

Combined application of polysaccharide microgels and surface-active materials for collecting oil or oil products from the surface of water ensures contraction of the film of oil or oil products, thus reducing its surface area, and—simultaneously—encapsulation of oil or oil products, thus preventing their second spreading on the water surface. Consequently, using a microgel of polysaccharides in conjunction with a surface-active agent produces a synergic effect. Surface-active materials possess high affinity to the phase interface and reduce surface tension at the water-air interface, while polysaccharide microgels have high affinity to oil and oil products, which results in a viscous film forming on their surface. These effects together produce steady beads of oil or oil products and of their agglomerates on the surface of water, which form a jelly-like mass, which can be skimmed and removed from the surface of water. Consequently, surface-active properties of the agents used for collecting oil or oil products from the surface of water have been improved, while specific consumption of polysaccharide microgels and biodegradable surface-active materials has been reduced. This improves effectiveness of the collection of oil or oil products from the surface of water. Using polysaccharide microgels without surface-active agents or using surface-active agents without polysaccharide microgels is less effective because spraying with just polysaccharide microgels does not result in contraction of oil films, while the use of surface-active materials on their own results in lenses and beads starting to spread out within 10-15 minutes after the application because concentration of surface-active agents on the surface of water drops and their interaction with oil occurs.

The ratio between polysaccharide microgels and the biodegradable surface-active agent must be maintained in the 12:1 to 2:1 range. The upper limit of the ratio between the polysaccharide microgels and the biodegradable surface-active material in the mixture is defined by the need to bind the surface-active agent with polysaccharide microgels. If the ratio of the polysaccharide microgels to the surface-active material is greater than 2:1, the excess of the surface-active material will dissolve in water in the form of micelles and pollute the environment. The lower limit of the ratio between polysaccharide microgels and the biodegradable surface-active material in the mixture is defined by the need to contract the oil film on the surface of water. If the ratio between polysaccharide microgels and the biodegradable surface-active material in the solution drops below 12:1, then effectiveness of the surface-active material decreases, so that the surface area of the oil film will not be reduced significantly.

Every version of the proposed methods includes spraying with polysaccharide microgels and the surface-active agent or their mixture, using an appropriate device (a nozzle or a sprayer) or applying them in the form of foam directly onto the surface of a film of oil or oil products. Once the film of oil or oil products has been treated with polysaccharide microgels and surface-active materials or with their mixture, the boundaries of the film can be protected by surrounding with nets or booms. The film of oil or oil products can also be protected by delineating its boundaries with nets or booms, a-priori treated with microgels of polysaccharides and/or surface-active agents, properties of which are revealed immediately when a net or a boom is introduced into the water. Once the film of oil or oil products has been treated with polysaccharide microgels and biodegradable surface-active substances, or with their mixture, the oil or oil products are scooped up with pumps, nets or skimmers. Standard methods are used for this, but their effectiveness improves because the treatment with polysaccharide microgels encapsulates the oil, it will not spread out or stick to the surface of the tools.

The proposed group of inventions is characterized by some new—with respect to the prototypes-properties, which bring about a new technological result: reduced specific consumption of the agents used for the collection of oil or oil products from the surface of water, improved surface-active properties of the agents, and the reduced residual quantity of these agents in the water.

Comparison of the proposed group of inventions with the prototypes suggests the following.

Neither polysaccharide microgels nor their mixtures with surface-active agents have been previously used for skimming oil or oil products from the surface of water. Using biodegradable surface-active agents in conjunction with polysaccharide microgels prevents dispersion of oil into small particles and their spread through the water. A reduced quantity of the residue of the reagents used left over in the water makes the oil collection process more ecologically safe. In addition, the technological solutions proposed make collection of oil or oil products more effective because the film shrinks and the oil becomes encapsulated at the same time.

The above discourse suggests that the proposed technological solutions meet the "invention criterion".

The proposed technological solutions can be used successfully in removing spills of oil or oil products from the surface of water. The material proposed can be manufactured and applied, using known means and methods. The proposed methods are applicable to real conditions, using known materials and substances. This suggests that the proposed solution meets the "industrial applicability" criterion.

The material and methods proposed can be illustrated by the following examples of their concrete application.

EXAMPLE 1

According to the Present Invention

A film of crude oil is skimmed from the surface of water, using a physically associated microgel based on chitosan and a cation surface-active material, both in the form of water solutions.

Chitosan (1 g) with a 95% deacetylation level and molecular weight of 60-200,000 D was dissolved in 1 liter of 0.01 M hydrochloric acid. A solution of sodium hydroxide of 0.05 M was added until pH=7.5. This suspension of chitosan microgel was centrifuged to produce a concentrated suspension (5 g/l), which was used for treating an oil film. The oil film was delineated in the reservoir, using a palmitoylcholine solution by spraying its 0.1 g/l aqueous solution along the outline of the oil film. The surface area of the oil film shrinks lenses and large beads form in the centre of the film, which is treated with a chitosan microgel (0.2 g/l). Gel formations appeared on the surface of oil beads, and agglomerates formed, which were then skimmed, using a fine-mesh net.

EXAMPLE 2

According to the Present Invention

Skimming the film of crude oil from the surface of water, using a physically associated microgel based on salts of carboxymethyl cellulose and anion surface-active material, both in the form of aqueous solutions.

Sodium salt of carboxymethyl cellulose (20 g), carboxymethyl group substitution level of 15-50%, molecular weight 30,000-120.000 D, was dissolved in 1 liter of water. A concentrated solution of hydrochloric acid was added to that solution until pH=3-4. The resultant solution of the microgel of carboxymethyl cellulose of 2% concentration was diluted tenfold with water and used for isolating an oil spill. The oil film in the reservoir was first delineated with a solution of phosphoric ether of cetyl alcohol by spraying its solution of 3 g/l concentration along the film outline. This resulted in the contraction of the film and formation of lenses and large beads in the centre, which then were treated with a carboxymethyl cellulose microgel (0.2 g/l). This resulted in a gel appearing on the surface of oil beads and in formation of agglomerates of 2-3 cm in size, which was then scooped up with a fine mesh net.

EXAMPLE 3

According to the Present Invention

Removal of a film of crude oil from the surface of water, using a chemically-bonded microgel, based on pectin and non-ionic surface-active material, both in the form of aqueous solutions.

Pectin (5 g) of 1-25% metoxylation and 20,000-100,000 D molecular weight was dissolved in 1 liter of sodium hydroxide solution (2 g/l). 2 g of benzylamin hydrochloride and 200 mg of diiso-cyanopropyl piperazine were added to that solution. After they have been completely dissolved, 3 ml of formalin were added, and left that solution for left for 2 h under vigorous stirring all the time. This solution of 0.5% concentration was acidified to produce a suspension of higher concentration (5 g/l), and then it was alkalified again with sodium hydroxide and used to skim an oil film. A pectin microgel suspension (5 g/l) was sprayed over the oil film in the reservoir. Jellified formations appeared on the surface of oil beads, resulting in the formation of lumps. To obtain denser agglomerates, stearyl saccharose (2 g/l) was added to that solution. The surface area of the spill decreases, lenses and large lumps formed in the centre, which were then scooped up with a fine-mesh net.

EXAMPLE 4

Collecting a crude oil film from the surface of water, using a mixture of aqueous solutions of a physically associated microgel based on chitosan and an anion surface-active material.

Chitosan (1 g) deacetylated at 95% and with 60,000-200,000 D molecular weight was dissolved in 1 liter of 0.01 M hydrochloric acid. That solution was brought to pH 7.5 by adding 0.05 M of sodium hydroxide solution.

A solution of surface-active material (cetyl phosphate) of 0.1 g/l concentration was added to that suspension of chitosan microgel (1.2 g/l). The resultant mixture was used for treating an oil film. The ratio between the polysaccharide microgels and surface-active materials in the final mixture was 12:1. The mixture was sprayed over the film of oil in the reservoir. The film contracted, and jellified formations appeared on the surface of oil beads, resulting in the formation of agglomerates, which were then scooped up with a fine-mesh net.

EXAMPLE 5

A film of crude oil from the surface of water was skimmed, using a mixture of aqueous solutions of a physically-associated microgel based on salts of carboxymethyl cellulose and a cation surface-active material.

A sodium salt of carboxymethyl cellulose (20 g) with carboxymethyl cellulose groups substituted at 15-50% and with molecular weight of 30,000-120,000 D was dissolved in 1 litre of water. A concentrated solution of hydrochloric acid was added to the that solution, bringing its pH to 3-4. The resultant solution of carboxymethyl cellulose microgel was diluted tenfold until a concentration of 0.6 g/l was established. To this suspension of carboxymethyl cellulose microgel was added an aqueous solution of a cation surface-active material (palmitoylcholine) of 0.1 g/l concentration. This mixture was used to treat a film of oil, while the ratio between polysaccharide microgels and surface-active materials became 6:1. This mixture was sprayed over the film in the reservoir. The film of oil contracted and jellified formations appeared on the surface of oil beads, which resulted in the formation of agglomerates of 2-3 cm in size, which then were scooped up with a fine-mesh nets.

EXAMPLE 6

Collection of a film of crude oil from the surface of water, using a mixture of aqueous solutions of physically-associated microgel based on salts of carboxymethyl cellulose and a cation surface-active material, applied as a foam.

A sodium salt of carboxymethyl cellulose (20 g) with carboxymethyl groups substitution of 15-50% and molecular weight of 30,000-120,000 D was dissolved in 1 litre of water. A concentrated solution of hydrochloric acid was used to bring the solution to pH=3-4. The final solution of the carboxymethyl cellulose microgel was diluted tenfold to obtain 0.4 g/l concentration. A cation surface-active material (palmitoylcholine) was added to the carboxymethyl cellulose microgel, bringing it to concentration 0.2 g/l. This mixture was used to treat a film of oil. The ratio between the polysaccharide microgels and surface-active materials in the final mixture was 2:1. This mixture was applied in the form of a foam along the outline of the film of oil in the reservoir. The film contracted, jellified formations were observed on the beads of oil, which were then scooped up with a fine-mesh net.

The proposed group of inventions can solve the assigned problem, producing the technological following technological results: reduction of specific consumption of the agents used down to 1-5 ml of solution per 1 m$^2$ (10-25 times lower than in the nearest analogues), 10-15 fold rise of surface-active properties of the agents used and decrease of the residual quantity of agents in water to a minimum concentration, when the agents have no negative effect on the environment.

The invention claimed is:

1. A composition operable to collect oil or oil products from a surface of water, comprising:
    a surface-active material in the form of an aqueous solution with a concentration at least 0.1 g/l; and
    polysaccharide microgels in a range of 20,000-200,000 Daltons and a particle size in a range of 50-600 nm and is in the form of an aqueous solution with a concentration of at least 0.2 g/l;
    wherein a ratio between the polysaccharide microgels and the surface-active material is in the range of 12:1 to 2:1;
    wherein the polysaccharide microgels are operable to interact with the oil or oil products to produce a collectable product in the form of a jellified mass.

2. The composition according to claim 1, wherein the polysaccharide microgels include microgels based on carboxymethyl cellulose, wherein the surface-active material includes either an anion or cation material.

3. The composition according to claim 1, wherein the polysaccharide microgels include microgels based on pectin substances, wherein the surface-active material includes either a non-ionogenic or anion surface-active materials.

4. The composition according to claim 1, wherein the polysaccharide microgels include chitosan-based microgels, wherein the surface-active material includes a cation surface-active material.

5. A method of collecting oil or oil products from a surface of water, comprising:
    treating the surface of a film of oil or oil products with an agent, wherein the agent includes polysaccharide microgels in a range of 20,000-200,000 Dalton mass and a particle size in a range of 50-600 nm size and is in the form of an aqueous solution with a concentration of at least 0.2 g/l;
    collecting a product of an interaction between the agent and the surface of the film of oil or oil products, wherein the collected product is in the form of a jellified mass;
    wherein, prior to or after the treating step, the film of oil or oil products is pre-treated or post-treated with a surface-active material in a form of an aqueous solution of 0.1 g/l concentration.

6. The method as claim 5, wherein the surface-active material is used to treat the film of oil or oil products along an outline thereof.

7. The method as in claim 5, wherein the microgels of polysaccharides include microgels based on pectin materials.

8. The method as in claim 5, wherein the polysaccharide microgels include microgels based on chitosan.

9. The method as in claim 5, wherein the polysaccharide microgels include microgels based on carboxymethyl cellulose.

10. A method for skimming oil or oil products from a surface of water, comprising:
    treating a surface of a film of oil or oil products with a first agent;
    skimming a product of an interaction between the first agent and the surface of the film of oil or oil products, wherein the skimmed product is in the form of a jellified mass;
    wherein the surface of the film of oil or oil products is treated with a second agent including polysaccharide microgels having a mass in a range of 20,000-200,000 Dalton and a particle size in a range of 50-600 nm, and is in a form of an aqueous solution with concentration of at least 0.2 g/l;

wherein the second agent is mixed with a surface-active agent in a form of an aqueous solution of at least 0.1 g/l concentration;

wherein the mixing step is continued until a ratio between the polysaccharide microgels to the surface-active agent is in a range of 12:1 to 2:1.

11. The method as in claim 10, wherein the polysaccharide microgels include microgels based on carboxymethyl cellulose, wherein the surface-active agent includes an anion or cation surface-active material.

12. The method as in claim 10, wherein the polysaccharide microgels include microgels based on pectin substances, wherein the surface-active agent includes a non-ionogenic or anion surface-active material.

13. The method as in claim 10, wherein the polysaccharide microgels include microgels based on chitosan, wherein the surface-active agent includes a cation surface-active material.

* * * * *